United States Patent
Cheng et al.

(10) Patent No.: US 8,599,730 B2
(45) Date of Patent: Dec. 3, 2013

(54) METHODS AND SYSTEMS FOR SPLIT TIMER L3 P2P COMMUNICATIONS

(75) Inventors: Steven D. Cheng, San Diego, CA (US); Tom Chin, San Diego, CA (US); Yu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 12/710,107

(22) Filed: Feb. 22, 2010

(65) Prior Publication Data
US 2010/0232330 A1 Sep. 16, 2010

Related U.S. Application Data

(60) Provisional application No. 61/160,272, filed on Mar. 13, 2009.

(51) Int. Cl.
*G08C 17/00* (2006.01)

(52) U.S. Cl.
USPC ....... 370/311; 455/343.4; 340/7.32; 713/323; 713/324

(58) Field of Classification Search
USPC ............... 370/311; 455/343.1–343.6, 574; 340/7.32–7.38; 713/300–322
See application file for complete search history.

(56) References Cited

U.S. PATENT DOCUMENTS

| 2005/0018624 | A1* | 1/2005 | Meier et al. | 370/318 |
| 2005/0075148 | A1* | 4/2005 | Park | 455/574 |
| 2005/0277417 | A1* | 12/2005 | Yoon et al. | 455/436 |
| 2006/0199621 | A1 | 9/2006 | Stirbu et al. | |
| 2006/0281436 | A1* | 12/2006 | Kim et al. | 455/343.2 |
| 2007/0242786 | A1* | 10/2007 | Kim et al. | 375/354 |
| 2007/0298778 | A1* | 12/2007 | Chion et al. | 455/422.1 |
| 2008/0095092 | A1* | 4/2008 | Kim | 370/311 |
| 2009/0323634 | A1* | 12/2009 | Kim et al. | 370/331 |
| 2011/0051638 | A1* | 3/2011 | Jeon et al. | 370/311 |

FOREIGN PATENT DOCUMENTS

| EP | 0615364 | 9/1994 |
| WO | 2007133034 A2 | 11/2007 |

OTHER PUBLICATIONS

International Search Report and Written Opinion—PCT/US2010/027068, International Search Authority—European Patent Office—Jun. 22, 2010.
Taiwan Search Report—TW099107162—TIPO—Apr. 6, 2013.

* cited by examiner

*Primary Examiner* — Mark Rinehart
*Assistant Examiner* — Mang Yeung
(74) *Attorney, Agent, or Firm* — Tyler J. Overall

(57) ABSTRACT

Methods and apparatus for reducing power consumption of a mobile station (MS) during layer 3 (L3) peer-to-peer (P2P) communications employing a request/response message pair are provided. To save power, the MS may enter a power saving mode after transmitting a request message and initiating a timeout timer for the message pair, wherein the power saving mode may have an interval available for receiving the response message and an unavailable interval. The timeout timer may be suspended during the unavailable interval and resumed during the available interval such that the timeout timer is effectively lengthened.

52 Claims, 14 Drawing Sheets

METHODS AND SYSTEMS FOR SPLIT TIMER L3 P2P COMMUNICATIONS

CLAIM OF PRIORITY

This application claims the benefit of priority from U.S. Provisional Patent Application Ser. No. 61/160,272, entitled "Split Timer Based L3 Peer-to-Peer Communications Model for WiMAX" and filed Mar. 13, 2009, which is assigned to the assignee of this application and is fully incorporated herein by reference for all purposes.

TECHNICAL FIELD

Certain embodiments of the present disclosure generally relate to wireless communications, and more particularly to an efficient peer-to-peer (P2P) communication scheme.

BACKGROUND

Orthogonal frequency-division multiplexing (OFDM) and orthogonal frequency division multiple access (OFDMA) wireless communication systems, such as those compliant with the Institute of Electrical and Electronics Engineers (IEEE) 802.16 family of standards, typically use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

One type of communication between the BS and the MS involves peer-to-peer communication on the network layer, or Layer 3 (L3) of the Open Systems Interconnection (OSI) Basic Reference Model (or OSI Model). This L3 peer-to-peer (P2P) communication is used by all of the signaling protocol, and the related scenarios occur during the initial network entry procedure, network re-entry procedure, or the normal operational mode.

During the initial network entry procedure and network re-entry procedure, an internet protocol (IP) connection has not yet been established, so there is no data traffic between the BS and the MS. Each pair of L3 peer-to-peer communications protocol (e.g., a request/response message pair) has a timeout value, and some pairs have a maximum number of retries associated therewith. With request/response message pairs, after the MS transmits a request message, the MS has to wait and scan all of the incoming symbols until it receives a response message or resends the request message after the timeout period expires (i.e., a timeout timer reaches the timeout value associated with the particular request/response message pair).

SUMMARY

Certain embodiments of the present disclosure provide a method for wireless communications. The method generally includes transmitting a request message, wherein the request message comprises information about a power saving mode, initiating a timeout timer to track a timeout period in which a response message in reply to the request message is expected, suspending the timeout timer during one or more unavailable intervals of the power saving mode, and resuming the timeout timer during one or more available intervals of the power saving mode, wherein a mobile station is able to receive the response message in the available intervals.

Certain embodiments of the present disclosure provide a method for wireless communications. The method generally includes receiving a request message from a mobile station, wherein the request message comprises information about a power saving mode and the power saving mode defines one or more intervals available for receiving a response message in reply to the request message and one or more unavailable intervals, initiating a timer to keep track of the available intervals based on the information received about the power saving mode, and transmitting the response message during one of the available intervals.

Certain embodiments of the present disclosure provide an apparatus for wireless communications. The apparatus generally includes means for transmitting a request message, wherein the request message comprises information about a power saving mode, means for initiating a timeout timer to track a timeout period in which a response message in reply to the request message is expected, means for suspending the timeout timer during one or more unavailable intervals of the power saving mode, and means for resuming the timeout timer during one or more available intervals of the power saving mode, wherein a mobile station is able to receive the response message in the available intervals.

Certain embodiments of the present disclosure provide an apparatus for wireless communications. The apparatus generally includes means for receiving a request message from a mobile station, wherein the request message comprises information about a power saving mode and the power saving mode defines one or more intervals available for receiving a response message in reply to the request message and one or more unavailable intervals, means for initiating a timer to keep track of the available intervals based on the information received about the power saving mode, and means for transmitting the response message during one of the available intervals.

Certain embodiments of the present disclosure provide an apparatus for wireless communications. The apparatus generally includes logic for transmitting a request message, wherein the request message comprises information about a power saving mode, logic for initiating a timeout timer to track a timeout period in which a response message in reply to the request message is expected, logic for suspending the timeout timer during one or more unavailable intervals of the power saving mode, and logic for resuming the timeout timer during one or more available intervals of the power saving mode, wherein a mobile station is able to receive the response message in the available intervals.

Certain embodiments of the present disclosure provide an apparatus for wireless communications. The apparatus generally includes logic for receiving a request message from a mobile station, wherein the request message comprises information about a power saving mode and the power saving mode defines one or more intervals available for receiving a response message in reply to the request message and one or more unavailable intervals, logic for initiating a timer to keep track of the available intervals based on the information received about the power saving mode, and logic for transmitting the response message during one of the available intervals.

Certain embodiments of the present disclosure provide a computer-program storage apparatus for wireless communications, comprising a memory device having instructions stored thereon, the instructions being executable by one or more processors. The instructions generally include instructions for transmitting a request message, wherein the request message comprises information about a power saving mode, instructions for initiating a timeout timer to track a timeout period in which a response message in reply to the request message is expected, instructions for suspending the timeout timer during one or more unavailable intervals of the power saving mode, and instructions for resuming the timeout timer during one or more available intervals of the power saving mode, wherein a mobile station is able to receive the response message in the available intervals.

Certain embodiments of the present disclosure provide a computer-program storage apparatus for wireless communications, comprising a memory device having instructions stored thereon, the instructions being executable by one or more processors. The instructions generally include instructions for receiving a request message from a mobile station, wherein the request message comprises information about a power saving mode and the power saving mode defines one or more intervals available for receiving a response message in reply to the request message and one or more unavailable intervals, instructions for initiating a timer to keep track of the available intervals based on the information received about the power saving mode, and instructions for transmitting the response message during one of the available intervals.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
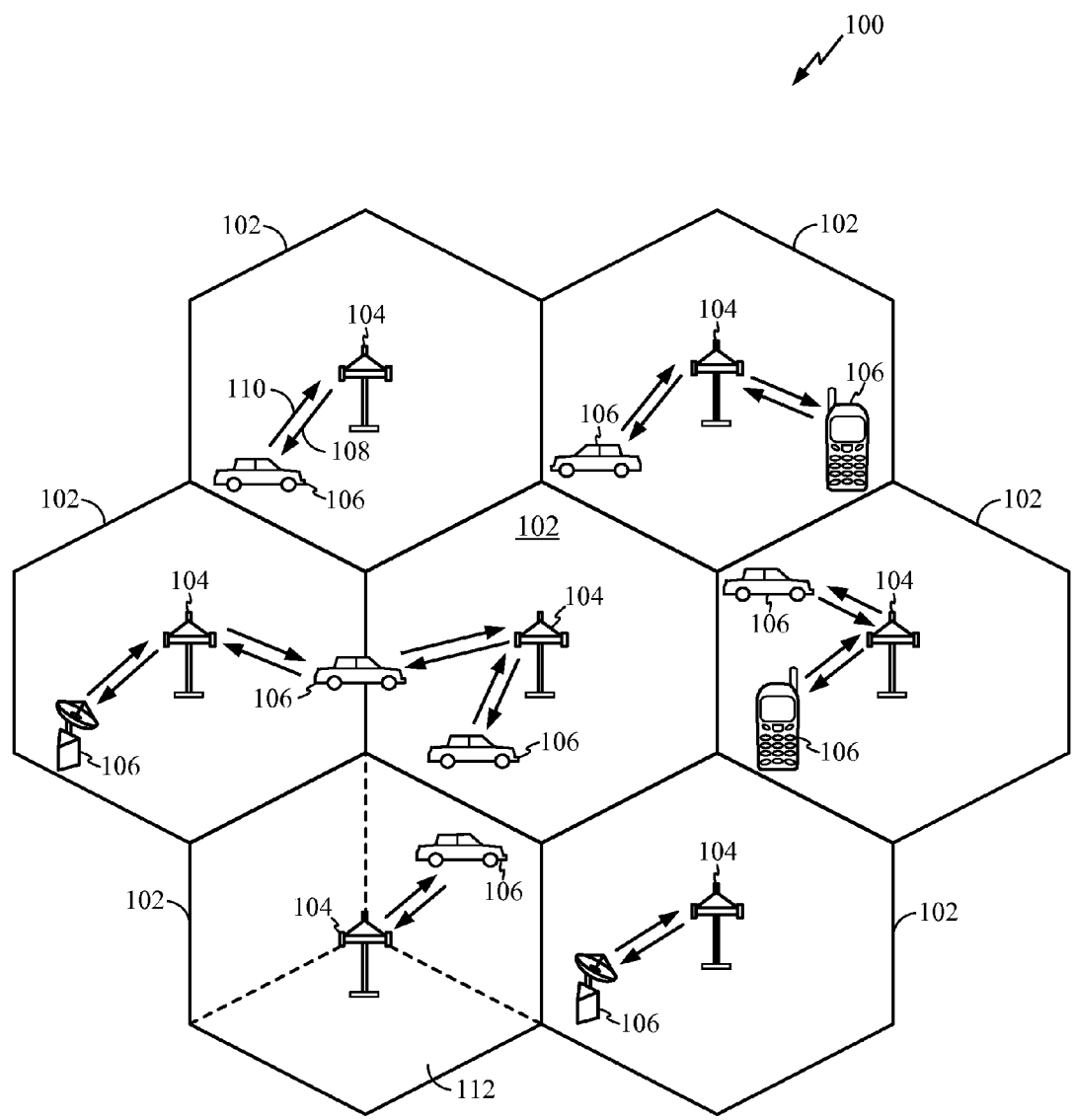
FIG. 1 illustrates an example wireless communication system, in accordance with certain embodiments of the present disclosure.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

The Institute of Electrical and Electronics Engineers (IEEE) 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
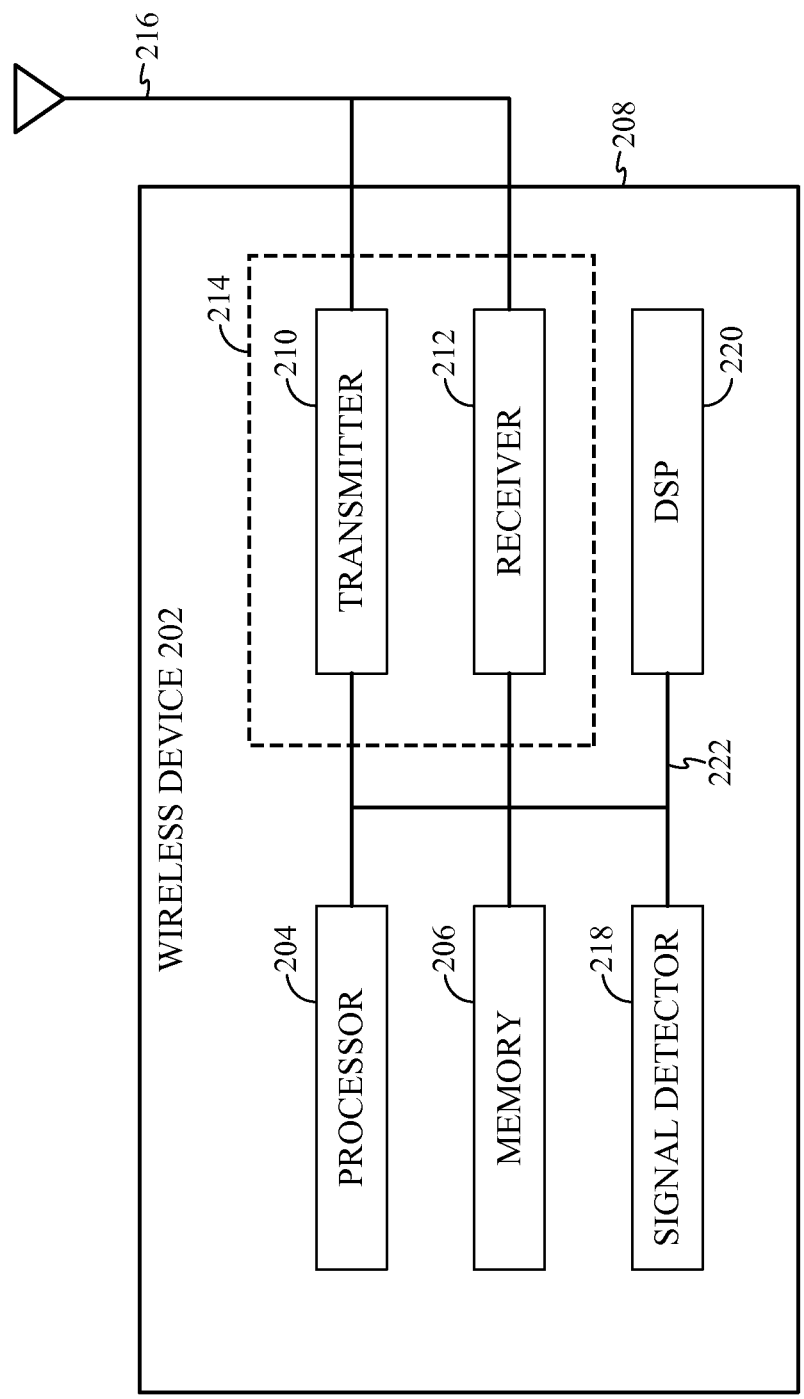
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
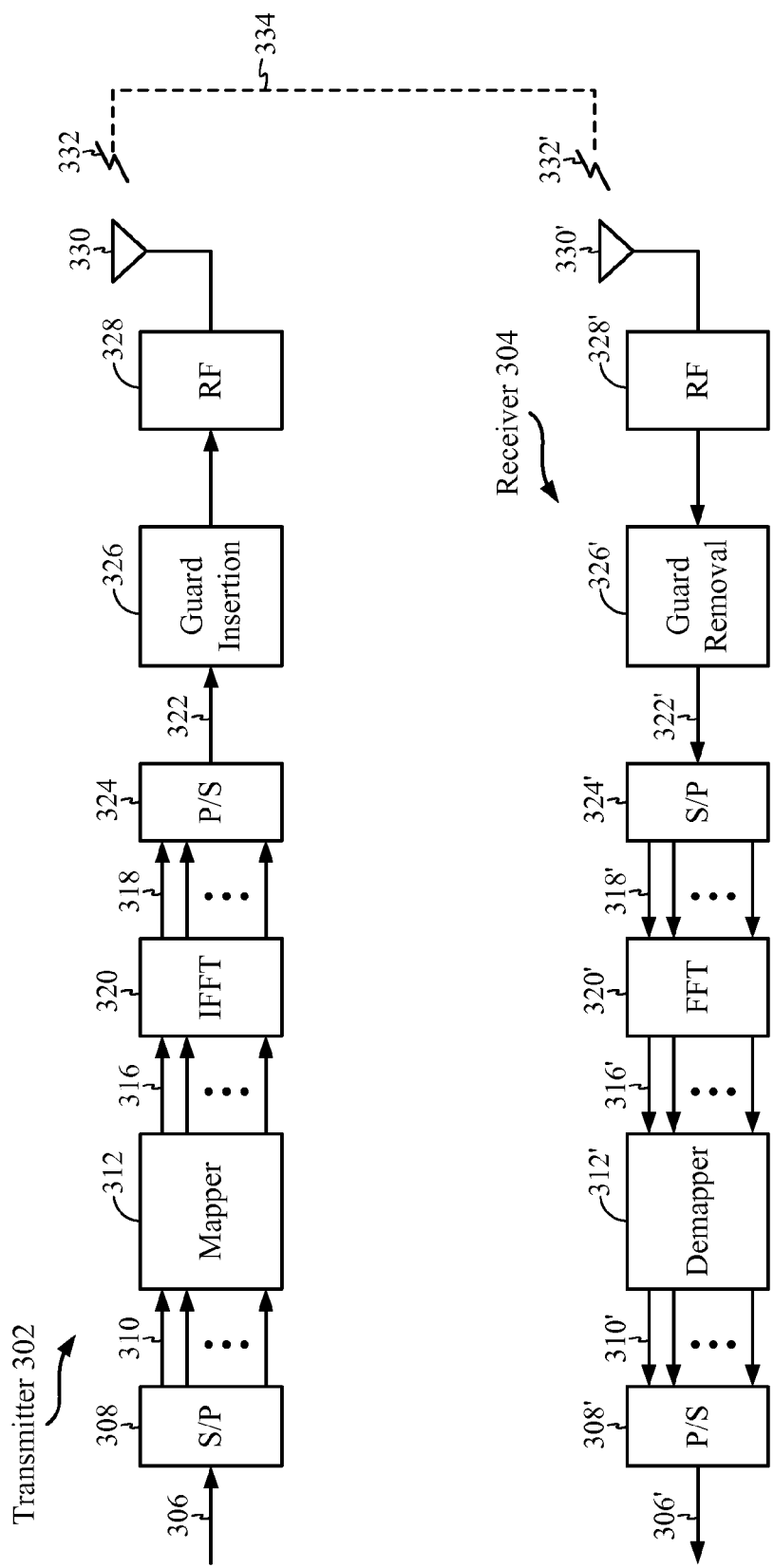
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8 PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_S$, is equal to $N_{cp}$, (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Split Timer Based L3 Peer-to-Peer (P2) Communications Scheme

Certain embodiments of the present disclosure provide techniques and apparatuses for reducing a mobile station's (MS) power consumption during peer-to-peer communications employing a request/response message pair. The peer-to-peer communication may be performed on the network layer (i.e., layer 3 (L3)) of the Open Systems Interconnection (OSI) Basic Reference Model (or OSI Model).

For certain embodiments, to save power, the MS may enter a power saving mode after transmitting a request message and initiating a timeout timer for the message pair. The power saving mode may have an interval available for receiving the response message and an unavailable interval. The timeout timer may be suspended during the unavailable interval and resumed during the available interval, and hence the name of "split timer", such that the timeout timer is effectively lengthened.

The split timer approach offers a number of advantages for both an MS and a BS. Not only can the MS reduce power consumption, but application software running on the MS may gain additional processing time through the effectively extended timeout timer. With the split timer approach, the BS may be able to decrease its response time to the MS if the BS is lightly loaded, or the BS may be able to respond to the request from the MS on time (due to the relaxed timing with the split timer) if the BS is overloaded.

In the L3 peer-to-peer communication procedure, after the MS transmits a request (REQ) message command, the MS may wait and scan all of the incoming symbols until it receives the response (RSP) message in reply to the REQ message, or resends the REQ message after the timeout period. On the BS side, there are several reasons that the BS may not respond to the request of the MS in time. For example, the BS may have received the REQ message from the MS, but the BS is busy processing other concurrent requests from other MSs. As another example, the BS may not have received the REQ message from the MS.

For a formal L3 peer-to-peer communication approach, a particular MS may share the loading penalty with other MSs. This problem gets worse as amount of traffic, which is represented by a traffic-loading factor, increases. Thus, the MS may likely waste power on scanning irrelevant data when the BS is overloaded. Accordingly, techniques and apparatuses are needed that enable an MS to perform L3 Peer-to-Peer communications with reduced power consumption.

Embodiments of the present disclosure introduce a solution to significantly reduce the power consumption used in the L3 peer-to-peer communications protocols during non-normal operational mode. The reduction in power consumption is achieved by using a WiMAX power savings feature, such as sleep mode or idle mode, to implement a new concept, called a "split timer." A split timer may be defined as a timer that can be split into several nonconsecutive periods in a synchronous manner on both the MS and the BS such that the MS and the BS communicate with each other only during the available intervals in the power savings mode of the MS.

For certain embodiments, length of the unavailable intervals may be defined by the traffic-loading factor. By suspending the timer at the unavailable intervals and resuming it at the available intervals, the timeout period on both the MS and the BS sides is effectively extended by the time used in the unavailable intervals.

The split timer approach may offer benefits to both the MS and the BS. From the MS perspective, the MS may reduce power consumption of its circuitry (e.g., by powering down the modem hardware) during the unavailable intervals. As a result, the application layer (Layer 7 or L7) of the MS may gain increased processing time due to the effectively extended timeout period. On the other hand, the BS may be able to respond to a request from the MS immediately if load of the system is light. If the BS is overloaded, the BS may still be able to respond to the request from the MS on time by responding to a relaxed timing requirement.

Figure 4:
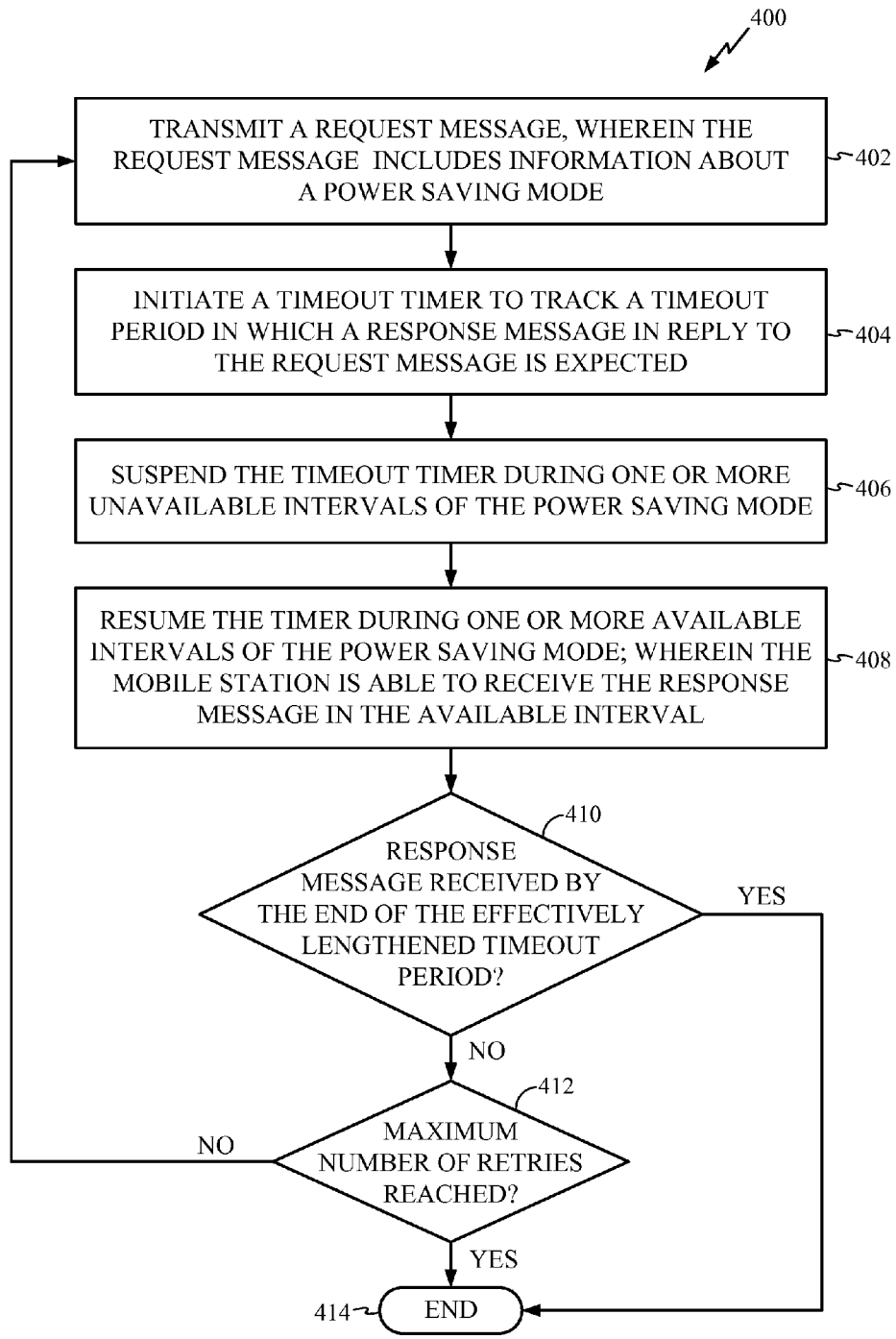
FIG. 4 is a flow chart of example operations for using a split timer for request and response messages according to Layer 3 peer-to-peer communications protocol from the perspective of a mobile station (MS), in accordance with certain embodiments of the present disclosure.

FIG. 4 illustrates example operations 400 for using a split timer for request (REQ) and response (RSP) messages according to L3 peer-to-peer communications protocol from the perspective of an MS, in accordance with certain embodiments of the present disclosure.

At 402, the MS transmits a REQ message, wherein the request message includes information about a power saving mode, such as a sleep mode or idle mode. The power saving mode may have one or more intervals available for receiving an RSP message and one or more intervals where the MS may be unavailable for receiving the RSP message. At 404, the MS initiates a timeout timer to track a timeout period in which the RSP message in reply to the REQ message is expected. The timeout period may be specific to a particular REQ/RSP pair.

At 406, the MS suspends the timeout timer during the one or more unavailable intervals of the power saving mode in an effort to effectively extend the timeout period. At 408, the MS resumes the timer during one or more available intervals of the power saving mode. In other words, the timeout timer may be divided into two or more nonconsecutive periods in which the timer is running separated by periods during which the timer is temporarily stopped. Therefore, the split timer is the timeout timer extended by the length of the unavailable intervals.

At 410, the MS may determine whether the RSP message has been received. Because the MS and the BS may be synchronized such that the BS is made aware of the split timer (i.e., the timing of the available versus unavailable intervals), the MS may receive the RSP message during one of the available intervals, but preferably should not receive the RSP message during the unavailable intervals.

If the MS determines at 412 that the RSP message was received at any time before the expiration of the effectively lengthened timeout period, the operations 400 may end at 414. However, if the MS determines that the RSP message was not received by the end of the extended timeout period, then at 412 the MS may determine whether the maximum number of retries (i.e., retransmissions) for the particular REQ/RSP message pair has been reached. If the maximum number of retries has not been reached or if the REQ/RSP message pair is not associated with a maximum number of retries, the MS may retransmit the REQ message at 402, and the operations 400 may repeat as described above. However, if the maximum number of retries has been reached, the operations 400 may end at 414.

Figure 5:
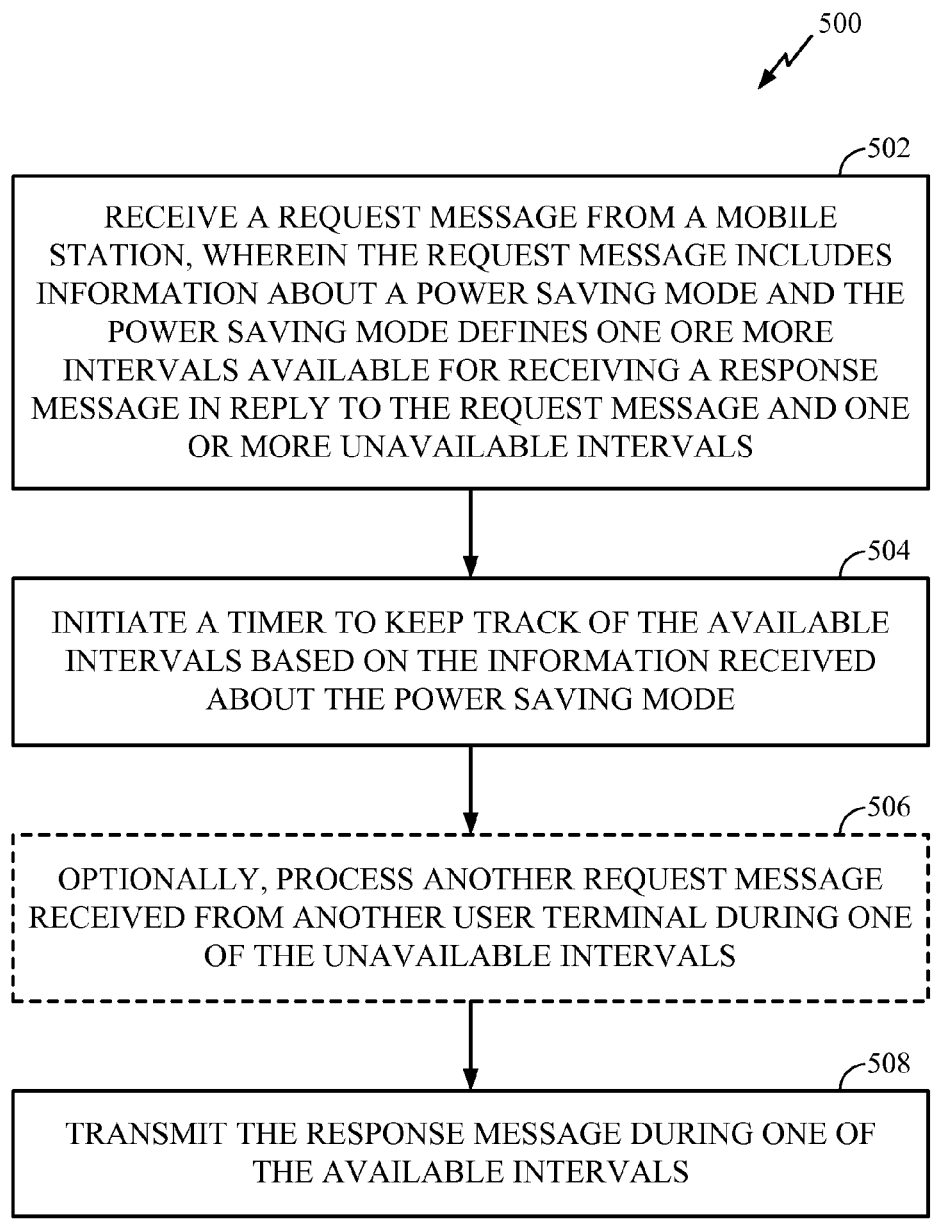
FIG. 5 is a flow chart of example operations for using a split timer for request and response messages according to Layer 3 peer-to-peer communications protocol from the perspective of a base station (BS), in accordance with certain embodiments of the present disclosure.

FIG. 5 illustrates example operations 500 for using a split timer for request and response messages according to L3 peer-to-peer communications protocol from the perspective of a BS 608, in accordance with certain embodiments of the present disclosure. The operations 500 may begin, at 502, by receiving an REQ message from a mobile station, wherein the REQ message includes information about a power saving mode. The power saving mode may define one or more intervals available for receiving an RSP message in reply to the REQ message and one or more intervals where the MS may be unavailable to receive the RSP message.

At 504, the BS initiates a timer to keep track of the available intervals based on the information received about the power saving mode. In addition, the unavailable intervals of the MS may allow the BS to perform operations for other MSs during corresponding time periods. Therefore, for some embodiments at 506, the BS may optionally process one or more other REQ messages received from one or more other MSs during the unavailable intervals.

At 508, the BS may transmit the RSP message during one of the available intervals. Because the BS 608 and the MS may be synchronized such that the BS is made aware of the split timer (i.e., the timing of the available versus unavailable intervals), the BS may transmit the RSP message during one of the available intervals, but preferably should not transmit the RSP message during the unavailable intervals.

Exemplary Split Timer During Normal Operation, Sleep and Idle Modes

Figure 6:
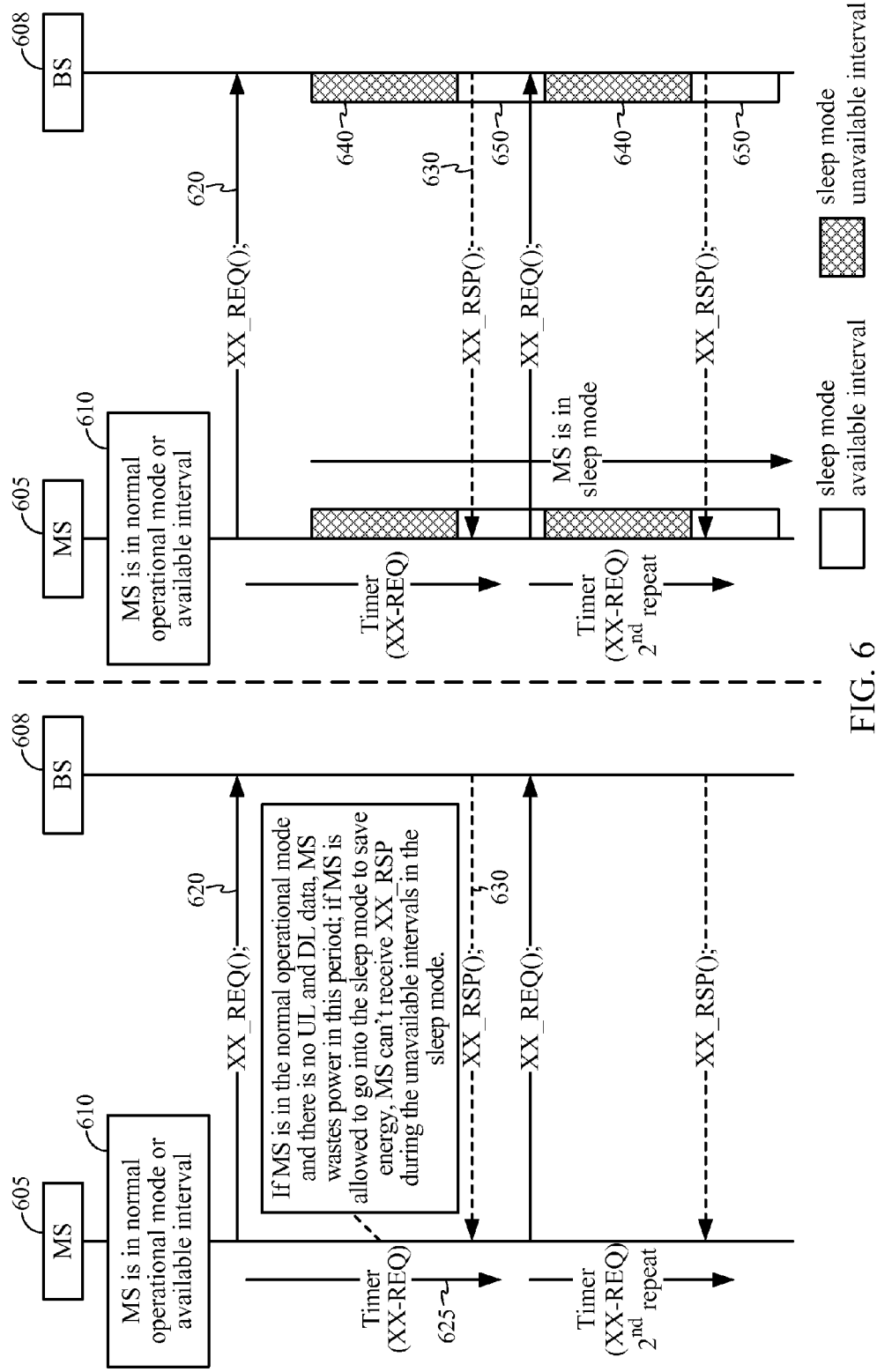
FIG. 6 compares a typical peer-to-peer approach to an approach using the split timer, allowing the MS to achieve a certain degree of power saving during the sleep mode unavailable interval, in accordance with certain embodiments of the present disclosure.

FIG. 6 compares a typical peer-to-peer approach to an approach using the split timer, allowing the MS to save power during the sleep mode unavailable interval, in accordance with certain embodiments of the present disclosure. In the typical approach depicted on the left, at 610 the MS 605, may be in a normal operational mode or any interval available for receiving a request (XX-REQ) message 620, such as a ranging request (RNG-REQ) or a dynamic service change (DSC-REQ) message. The MS may employ a timeout timer 625 in an effort to determine whether a response (XX-RSP) message 630 is received within the timeout period associated with the request/response message pair.

If the MS does not receive the XX-RSP message 630 at the expiration of the timeout timer 625, the MS may retransmit the XX-REQ message 620 and restart the timeout timer 625. When the MS is in the normal operational mode and there is no uplink or downlink data, the MS may waste power after transmitting the XX-REQ message 620 if the modem is powered up while waiting for the XX-RSP message 630 to arrive.

Therefore, FIG. 6 illustrates a split timer approach on the right to reduce power consumption of the MS while waiting for the XX-RSP message 630. The basic idea here is to have the MS enter a power savings mode after the MS transmits the XX-REQ message 620. For example, the MS may enter a sleep mode where some of the circuitry of the MS (e.g., the modem circuitry) may be powered off during the unavailable interval 640, in which the MS may not receive the XX-RSP message 630. Because the BS 608 is made aware that the MS is in the power savings mode, the MS may wake up according to the timing when the BS is ready to respond. Thus, the previously powered down circuitry of the MS may be powered up during the available interval 650, in which the MS may receive the XX-RSP message 630 from the BS 608. In this manner, the MS may not waste power or spend time to process irrelevant symbols broadcasted from the BS during the waiting period (i.e., the unavailable interval 640).

Figure 7:
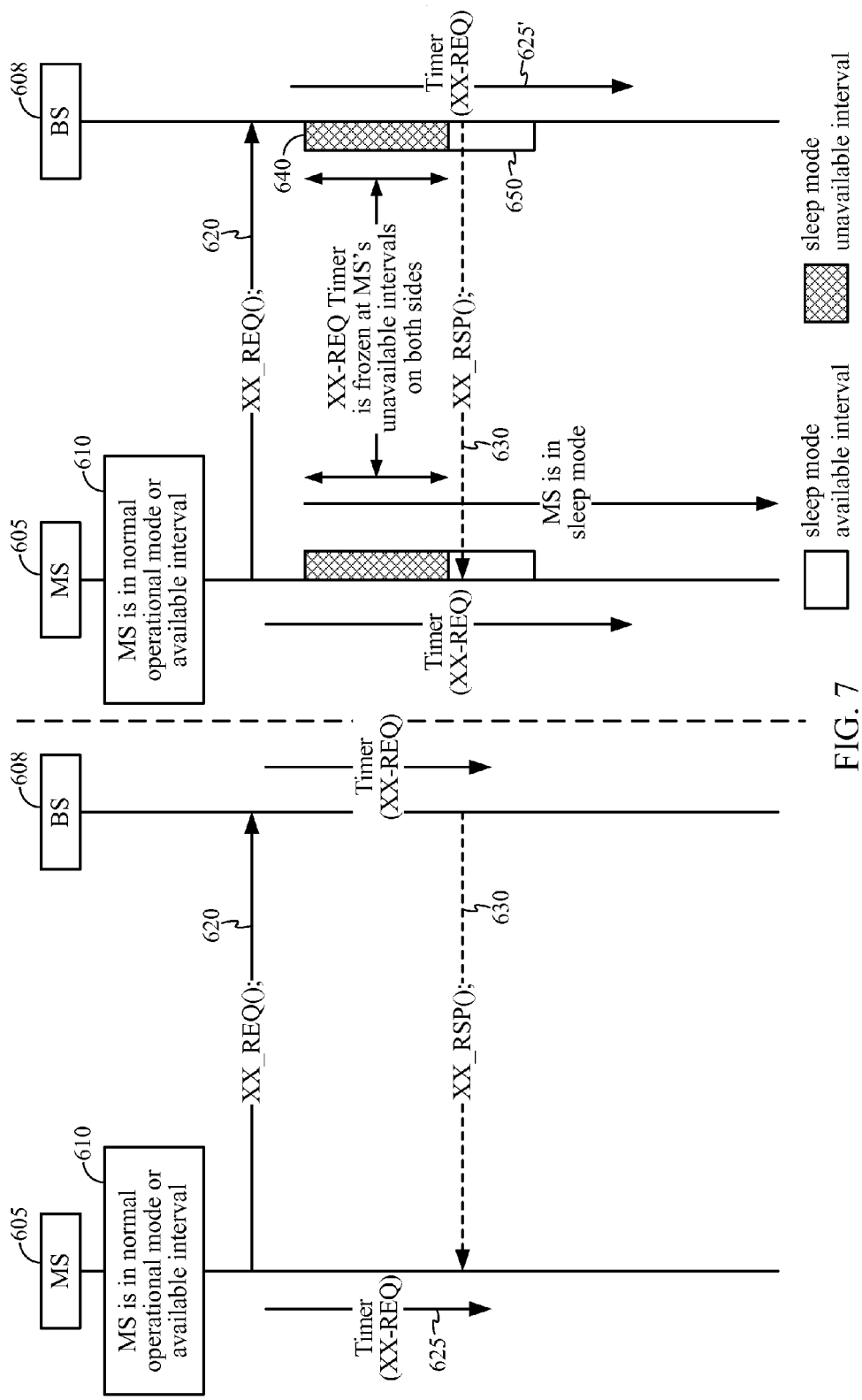
FIG. 7 illustrates one request and response message pair of FIG. 6 in greater detail, depicting how the timeout timer for the request (XX-REQ) message is suspended during the unavailable intervals of the MS on both the MS and the BS, such that the XX-REQ timer is virtually extended by the length of the unavailable interval, in accordance with certain embodiments of the present disclosure.

FIG. 7 illustrates a request and response message pair of FIG. 6 in greater detail, depicting how the timeout timer 625 associated with the XX-REQ message is suspended during the unavailable intervals of the MS at both the MS and the BS, such that the XX-REQ timer is virtually extended by the length of the unavailable interval of the MS, in accordance with certain embodiments of the present disclosure. Comparing the length of the timeout timer 625' on the right using the split timer approach to the timeout timer 625 on the left shows the extension of the length of the timeout timer 625' by the length of the unavailable intervals when utilizing the split-timer approach.

For certain embodiments, length of the available and unavailable intervals used in the special sleep mode according to the split-timer-based L3 peer-to-peer communications protocol may be defined by the serving BS. Lengths of the available interval may be represented by x and length of the unavailable interval may be represented by y such that x<<y. Total number of MS-initiated request/response message pairs of L3 peer-to-peer communications protocol may be represented by n and the timeout value of each pair may be represented as $T_{REQ}(i)$, where i is equal to 1, 2, ..., n. Maximum repeat transmission number of each pair may be represented by $R_{REQ}(i)$, where i=1, 2, ..., n.

The actual number of retransmissions for each request/response message pair may be represented by $AR_{REQ}(i)$ where i=1, 2, ..., n. In order to comply with the maximum delay used by each pair of L3 peer-to-peer communications protocol, the lengths of the available and unavailable intervals may be determined by the following equation:

$$n \times (x+y) \leq n \times \min\{RREQ(i)\} \leq \text{sum}\{RREQ(i) \times TREQ(i)\}$$

such that $x+y<T_{REQ}(i)$, where, i=1, 2, ..., n. Note, as shown in the IEEE 802.16e standard document, the timeout value of each request/response message pair may be different.

For certain embodiments, a user experience constraint may also be imposed on the above equation. The user experience constraint may refer to an operation that a user may prefer to complete within a given time, such as $T_{user\_experience}$; otherwise, the user may complain about the service. In order to comply with a specific user experience constraint $T_{user\_experience}$, maximum allowable time to complete the L3 peer-to-peer communications protocol from the first message pair to the last pair may be determined by the following equation:

$$n \times (x+y) < T_{user\ experience}$$

such that $x+y<T_{REQ}(i)$, where i=1, 2, ..., n.

From the perspective of the user, the maximum total processing time being saved using the split timer approach may be represented by y. The maximum total processing time that is saved may also be expressed as a percentage of the total time, the ratio of y/(x+y). Since x<<y, the total power savings obtained by performing the split-timer-based L3 peer-to-peer communications protocol may be substantial. For example, if x=20 ms (e.g., four frames) and y=50 ms (e.g., ten frames), then 5/7=71.43% of the power may be saved.

For certain embodiments, the serving BS may determine the length y of the unavailable interval 640 based upon the traffic loading factor, such that the length of the unavailable interval is longer if the traffic loading factor is close to 100% and shorter if the traffic loading factor is close to zero. Accordingly, if a serving BS is overloaded, the average processing speed for each registered MS may slow down such that the average response time increases.

Using the split-timer approach according to certain embodiments of the disclosure, the actual power consumption of the BS may be constant, but the MS may skip all of the waiting time in an intelligent manner by not parsing any symbols or data during the waiting period. The split-timer scheme may save more time in an overloaded serving BS. Further, for a lightly-loaded serving BS, the MS may still save power utilizing the split-timer approach by turning off the hardware during the waiting time that is used by the BS to process the request from the MS.

It should be noted that with the split timer approach, significant changes may not need to be made to the WiMAX standard. For example, the timeout values for the various response/request message pairs may remain similar to the values defined in the IEEE 802.16e standard.

Figure 8:
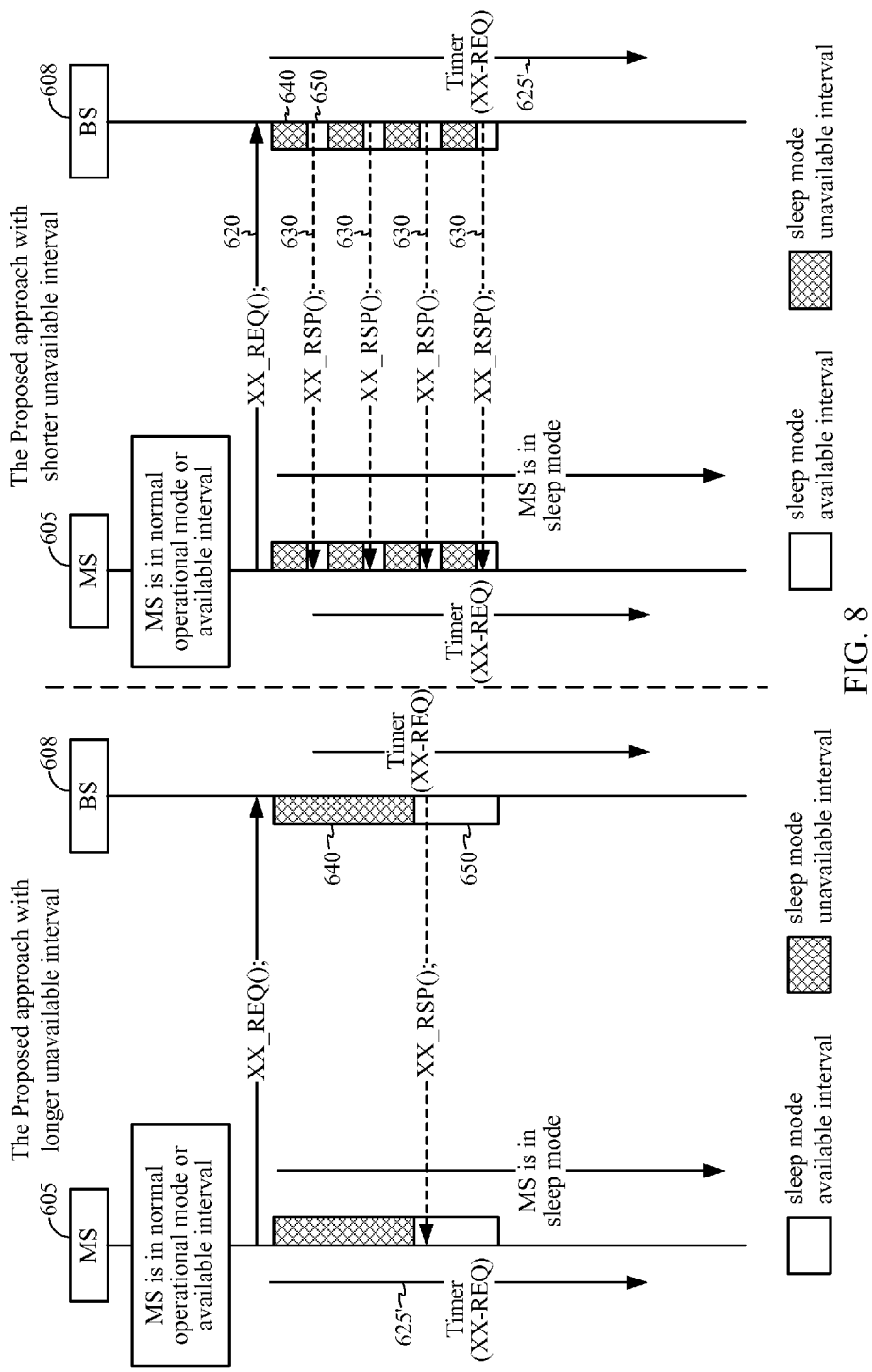
FIG. 8 illustrates a comparison between longer and shorter unavailable intervals in a peer-to-peer approach using a split timer, in accordance with certain embodiments of the present disclosure.

FIG. 8 illustrates a comparison between longer and shorter unavailable intervals in a peer-to-peer approach using a split timer scheme, in accordance with certain embodiments of the present disclosure. In essence, the shorter unavailable interval may allow a faster turnaround time, but at the expense of more overhead in powering off and on the circuitry of the MS.

An XX-REQ message 620 may be associated with a timeout period, $T_{XX-REQ}$. As shown in FIG. 8, a single unavailable interval, $T_u$, and an available interval, $T_a$, may be assigned to the timeout timer 625'. As an alternative approach, this single unavailable interval and available interval may be partitioned into n equally-sized partitions, such that each partition has an unavailable interval $T_{pu}$, and an available interval $T_{pa}$, where $T_u=n \times T_{pu}$ and $T_a=n \times T_{pa}$.

The best response time for the longer unavailable interval approach may be equal to $T_u$, whereas the best response time for the shorter unavailable interval approach may be $T_{pu}$. Since $T_u=n \times T_{pu}$, the shorter unavailable interval approach may most likely have a better response time.

For certain embodiments, average response time for the longer unavailable interval approach may be equal to $T_u$, and average response time for the shorter unavailable interval approach may be expressed as $(n/2) \times T_{pu}$. Since $T_u=n \times T_{pu}>(n/2) \times T_{pu}$, the shorter unavailable interval approach may be characterized by a better average response time.

The time to power down and bring up circuitry of the MS in the power savings mode may be represented by $T_p$. Therefore, the power saving time in the longer approach may be represented as $T_u-T_p$, while the power saving time in the shorter approach may be expressed as $n \times T_{pu}-n \times T_p=T_u-n \times T_p$. As a result, the longer unavailable interval approach may have better power saving time which results in saving more power. In other words, the shorter unavailable interval approach may result in higher overhead in terms of powering off and on the circuitry of the MS.

Exemplary Mobile Station Uses for Split Timer

When the MS and the BS are either in sleep mode or in idle mode, there may be an L3 peer-to-peer signaling procedure going on between the MS and the BS. Therefore, both the MS and the BS may simultaneously suspend their timeout timers 625 during the unavailable interval 640 and simultaneously resume their timeout timers 625 during the available interval 650. The suspension and resumption of the timeout timers may be performed simultaneously by both the MS and the BS because they are synchronized.

By suspending the timer at the unavailable interval 640 and resuming the timer at the available interval 650, the virtual timeout timer 625' on the MS-side may be extended by adding the time used in the unavailable intervals 640 to the time counted by the timeout timer.

Figure 9:
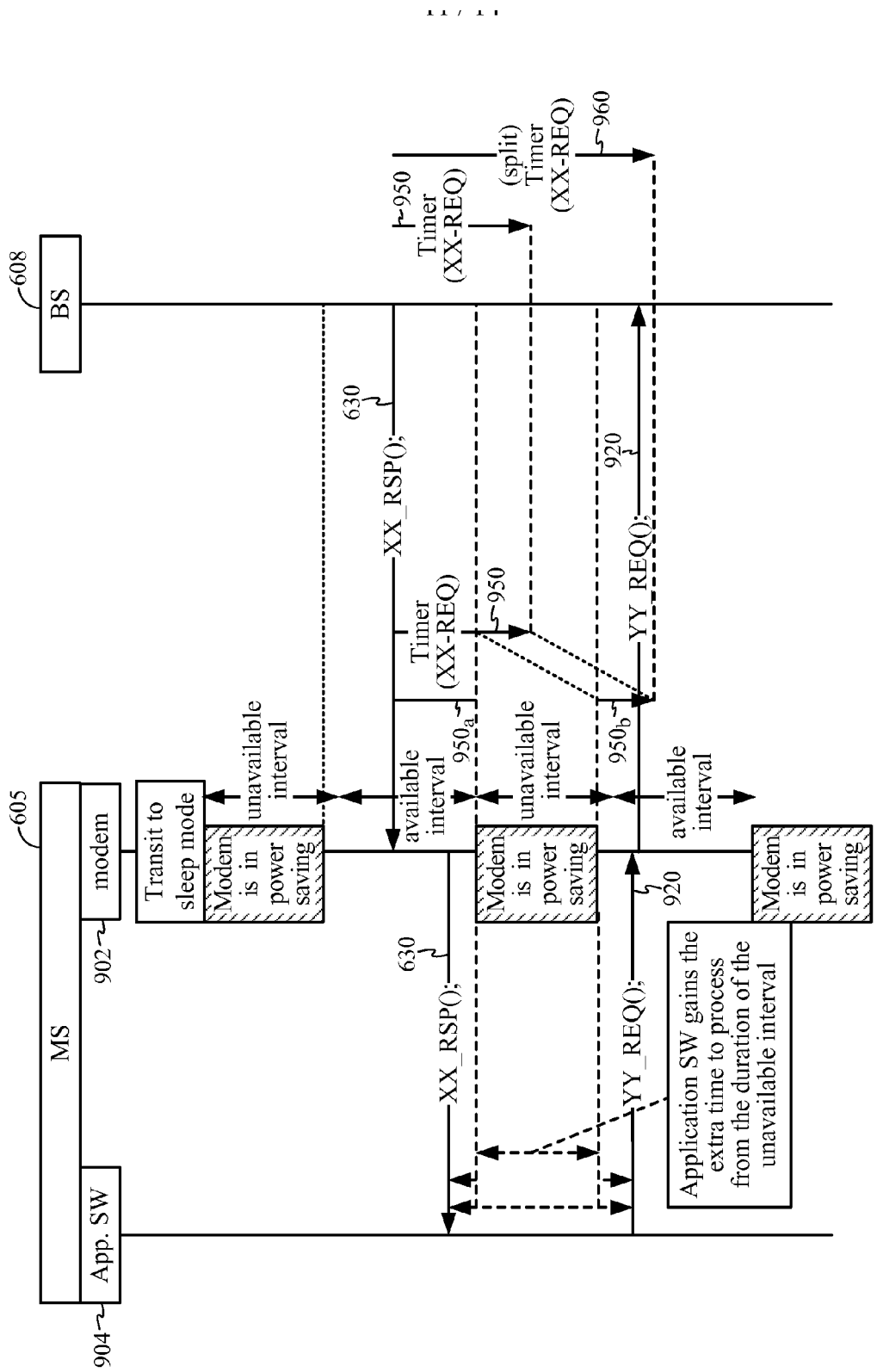
FIG. 9 illustrates how application software running on the MS may benefit from extra processing time during the unavailable interval(s), in accordance with certain embodiments of the present disclosure.

An MS may have two major sub-systems, a modem 902 and an application software 904, typically running on the processor 204 of the MS. FIG. 9 illustrates how the application software 904 running on the MS may benefit from extra processing time during the unavailable intervals 640, in accordance with certain embodiments of the present disclosure.

If the split-timer-based L3 peer-to-peer communication protocol is implemented on both the MS and the BS, and part of the activity of the MS involves the application layer software, the MS may use the unavailable intervals 640 to process the application layer tasks. Therefore, the response time to the BS 608 during the available intervals 650 may significantly be decreased.

Some of the tasks running on the application-side can be time-consuming and may affect the round trip delay. By having the application software 904 process the XX-RSP message 630 and a new request (YY-REQ) message 920 during the unavailable interval 640 of the modem, the round trip delay may be substantially reduced, so that the MS may meet the system level timing requirements easier. With this approach, the MS does not need to use a faster processor to speed up the processing used for both the application software 904 and the modem 902.

FIG. 9 also illustrates how the timeout timer 950 for a particular request/response message pair may be effectively lengthened into the split timer 960. By running the timeout timer 950 during the available intervals 650 and suspending the timeout timer 950 during the unavailable intervals 640, the timeout timer 950 may be virtually extended into the split timer 960, even though sum of the portions 950a, 950b of the timeout timer operating during the available intervals 650 are equal to the total length of the timeout timer 950.

Exemplary Base Station Uses for Split Timer

Figure 10:
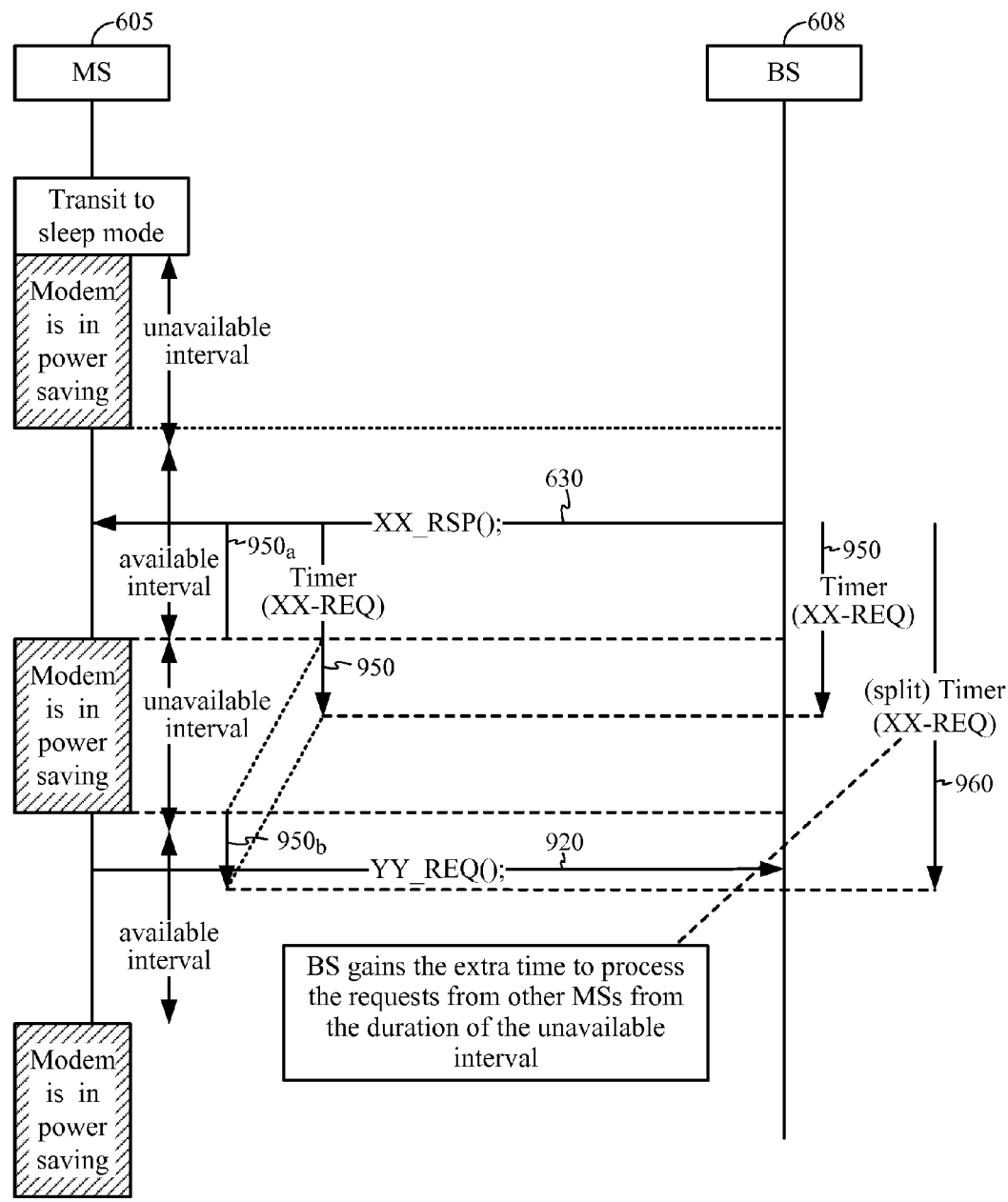
FIG. 10 illustrates how the BS may benefit from extra time to process request messages received from other MSs during the unavailable interval(s), in accordance with certain embodiments of the present disclosure.

FIG. 10 illustrates how the BS 608 may benefit from extra time to process request messages (not shown) received from other MSs during the unavailable intervals 640, in accordance with certain embodiments of the present disclosure. If the split-timer-based L3 peer-to-peer communication protocol is implemented at the BS side, the BS 608 may either process more requests from multiple MSs during the same timing requirements associated with each feature, or the BS may use the unavailable intervals of the MS to process the other activities on the BS side, so the response time to the MS during the available intervals 650 is significantly decreased.

Since one serving BS may handle requests from multiple MSs concurrently, the split timer scheme may allow the BS to process more concurrent MS requests without a need to upgrade the processor or hardware capability of the BS.

Exemplary Split Timer During Initial Network Entry and Re-Entry Modes

The split timer approach described above for normal operational mode may also be added to the L3 peer-to-peer communications model while the MS is in the initial network entry or network re-entry mode. During the initial network entry and network re-entry modes, there are no active transport channels, so only the peer-to-peer communications exist. Both the initial network entry and network re-entry procedures start with the ranging procedure, where the MS may send a ranging request (RNG-REQ) message 1102 and the BS may reply with a ranging response (RNG-RSP) message 1104.

Both uplink and downlink communications between the MS and the BS are synchronized after the ranging procedure is successfully completed. For certain embodiments, the earliest common place to enter the power savings mode according to the split timer approach may be through the ranging response (RNG-RSP) message 1104.

Figure 11:
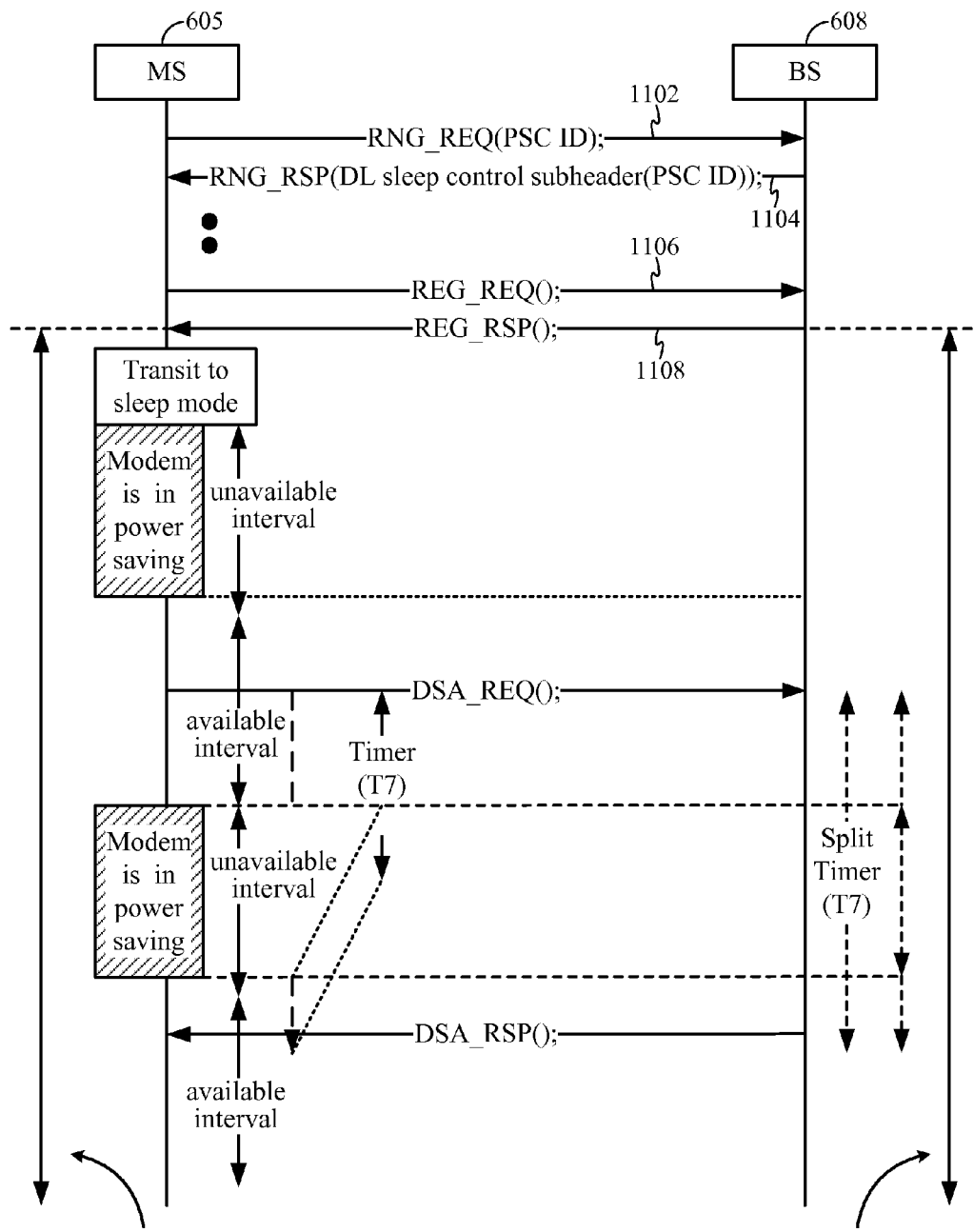
FIG. 11 illustrates using the split timer scheme during the initial network entry procedure, in accordance with certain embodiments of the present disclosure.

FIG. 11 illustrates using the split timer during the initial network entry procedure, in accordance with certain embodiments of the present disclosure. For the initial network entry procedure, the split timer approach may be activated after the MS transmits a registration request (REG-REQ) message 1106 and the BS responds with a registration response (REG-RSP) message 1108 as shown.

Therefore, after synchronization, the BS and the MS may use a split timer approach to enter power saving mode and extend the time shown by the timeout timer by suspending the timeout timer during the unavailable intervals during the initial network entry procedures (e.g., transmitting dynamic service addition request/response (DSA_REQ/RSP) message pair).

Figure 12:
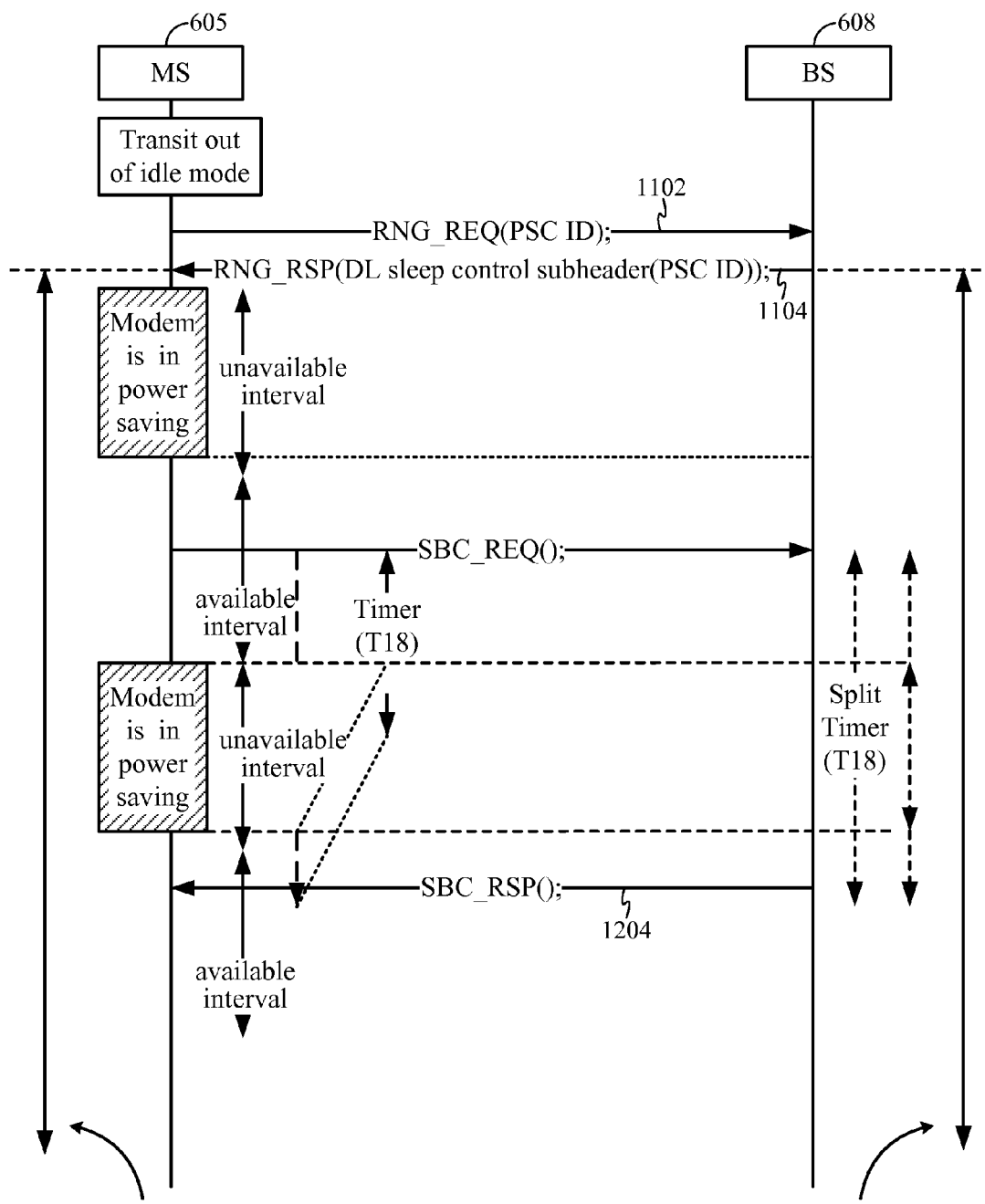
FIG. 12 illustrates using the split timer scheme during the network re-entry procedure, in accordance with certain embodiments of the present disclosure.

FIG. 12 illustrates using the split timer during the network re-entry procedure, in accordance with certain embodiments of the present disclosure. For the network re-entry procedure, the split timer approach may be activated after the BS transmits the RNG-RSP message 1104 to the MS. As a result, the subscriber station basic capability request/response (SBC_REQ/RSP) message pair may be transmitted between the MS and the BS more efficiently.

For certain embodiments, the sleep control message may be delivered through a medium access control (MAC) message, a Bandwidth Request (BR), an UL sleep control header, or a DL sleep control extended subheader. Using the DL sleep control extended subheader approach may allow the BS-initiated sleep mode control procedure to be piggybacked into existing DL MAC messages.

The DL sleep control extended subheader includes six fields, such as Power_Saving_Class_ID, Operation, Final_Sleep_Window_Exponent, Final_Sleep_Window_Base, Stop_CQI_Allocation_Flag and Start frame. For certain embodiments, the Power_Saving_Class info may be included in the RNG-REQ message 1106 provided by the MS. In this case, the Start frame is the frame in which the serving BS sends the SBC-RSP message 1204 as shown in FIG. 12.

Embodiments of the present disclosure proposed power saving schemes using a split-timer approach that may result in more efficient peer-to-peer communications between a mobile station and a base station.

Figure 4A:
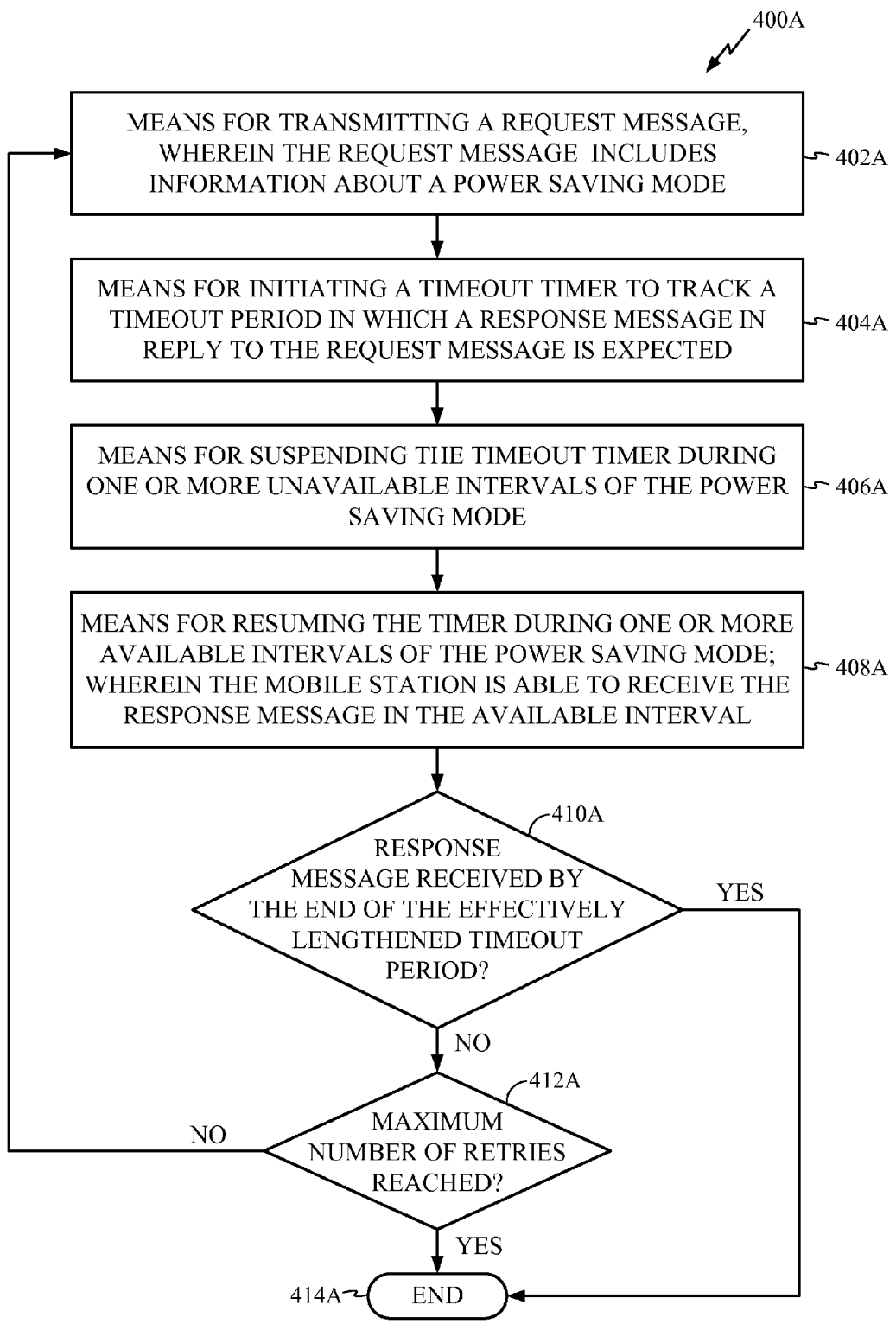
FIG. 4A is a block diagram of means corresponding to the example operations of FIG. 4 for using a split timer, in accordance with certain embodiments of the present disclosure.
Figure 5A:
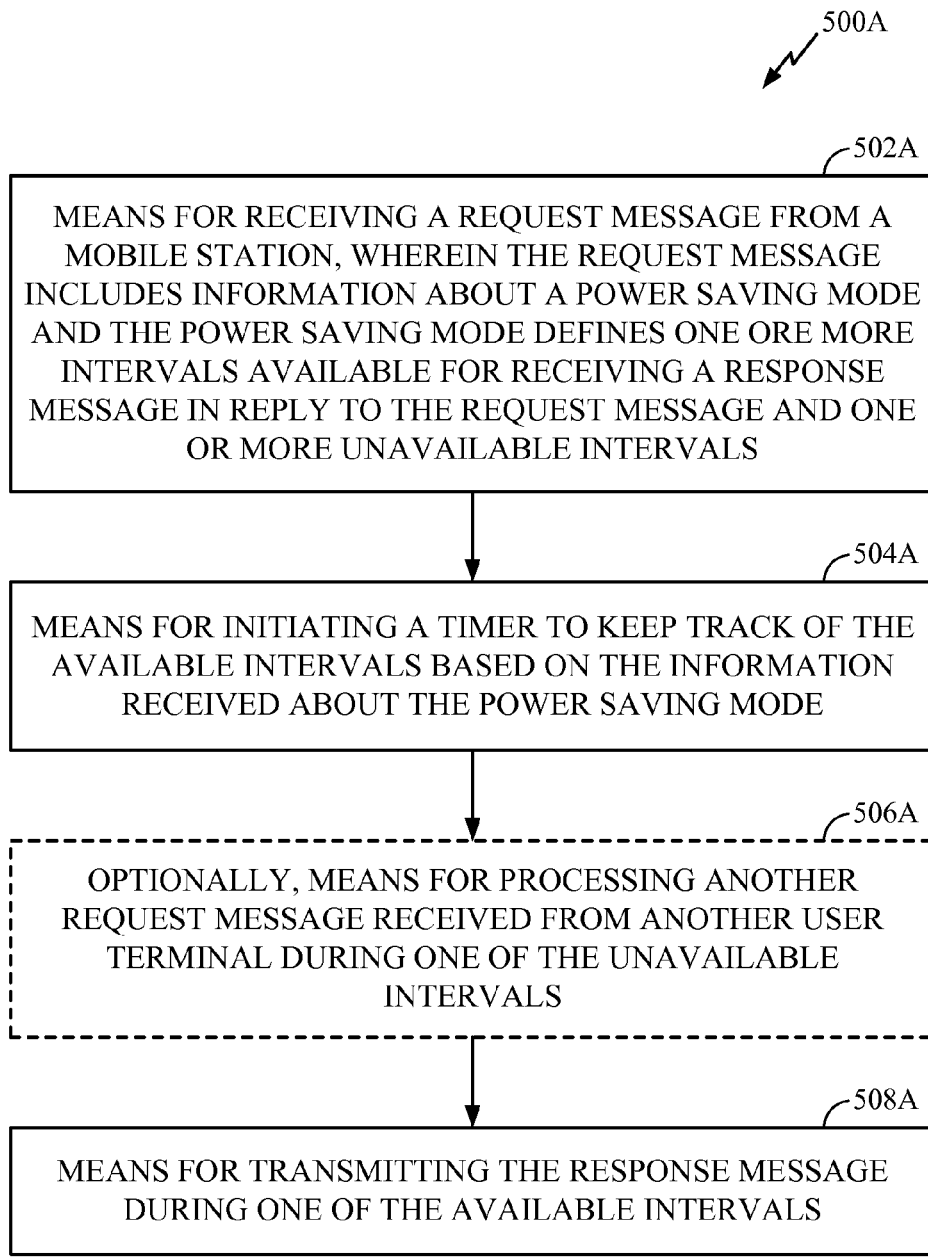
FIG. 5A is a block diagram of means corresponding to the example operations of FIG. 5 for using a split timer, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-414 illustrated in FIG. 4 and blocks 502-508 illustrated in FIG. 5 correspond to means-plus-function blocks 402A-414A illustrated in FIG. 4A and blocks 502A-508A illustrated in FIG. 5A, respectively.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits, or generally, logic, described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium, or memory device, that is known in the art. Some examples of storage media or devices that may be used include random access memory (RAM), flash memory, read only memory (ROM), EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media or memory devices may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a user terminal and/or base station as applicable. For example, such a device can be coupled to a server to facilitate the transfer of means for performing the methods described herein. Alternatively, various methods described herein can be provided via a storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
    transmitting a request message, wherein the request message comprises information about a power saving mode;
    initiating a timeout timer to track a timeout period in which a response message in reply to the request message is expected;
    suspending the timeout timer during one or more unavailable intervals of the power saving mode; and
    resuming the timeout timer during one or more available intervals of the power saving mode; wherein a mobile station is able to receive the response message in the available intervals.

2. The method of claim 1, further comprising:
    receiving the response message during one of the available intervals.

3. The method of claim 1, further comprising:
    retransmitting another request message if the response message is not received before end of the timeout period.

4. The method of claim 1, wherein the power saving mode comprises a sleep mode.

5. The method of claim 1, wherein the request message is transmitted during an initial network entry procedure or a network re-entry procedure.

6. The method of claim 5, wherein the request message is transmitted during the initial network entry procedure after receiving a Registration Response (REG-RSP) message.

7. The method of claim 5, wherein the request message is transmitted during the network re-entry procedure after receiving a Ranging Response (RNG-RSP) message.

8. A method for wireless communications, comprising:
    receiving a request message from a mobile station, wherein the request message comprises information about a power saving mode and the power saving mode defines one or more intervals available for receiving a response message in reply to the request message and one or more unavailable intervals;
    initiating a timer to keep track of the available intervals based on the information received about the power saving mode;
    suspending the timer during the one or more unavailable intervals of the power saving mode;
    resuming the timer during the one or more available intervals of the power saving mode; and
    transmitting the response message during one of the available intervals.

9. The method of claim 8, further comprising:
    processing another request message received from another mobile station during one of the unavailable intervals.

10. The method of claim 8, wherein the power saving mode comprises an idle mode.

11. The method of claim 8, wherein the request message is received during an initial network entry procedure or a network re-entry procedure.

12. The method of claim 11, wherein the request message is received during the initial network entry procedure after transmitting a Registration Response (REG-RSP) message.

13. The method of claim 11, wherein the request message is received during the network re-entry procedure after transmitting a Ranging Response (RNG-RSP) message.

14. An apparatus for wireless communications, comprising:
    means for transmitting a request message, wherein the request message comprises information about a power saving mode;
    means for initiating a timeout timer to track a timeout period in which a response message in reply to the request message is expected;
    means for suspending the timeout timer during one or more unavailable intervals of the power saving mode; and
    means for resuming the timeout timer during one or more available intervals of the power saving mode; wherein a mobile station is able to receive the response message in the available intervals.

15. The apparatus of claim 14, further comprising:
    means for receiving the response message during one of the available intervals.

16. The apparatus of claim 14, further comprising:
    means for retransmitting another request message if the response message is not received before end of the timeout period.

17. The apparatus of claim 14, wherein the power saving mode comprises a sleep mode.

18. The apparatus of claim 14, wherein the request message is transmitted during an initial network entry procedure or a network re-entry procedure.

19. The apparatus of claim 18, wherein the request message is transmitted during the initial network entry procedure after receiving a Registration Response (REG-RSP) message.

20. The apparatus of claim 18, wherein the request message is transmitted during the network re-entry procedure after receiving a Ranging Response (RNG-RSP) message.

21. An apparatus for wireless communications, comprising:
   means for receiving a request message from a mobile station, wherein the request message comprises information about a power saving mode and the power saving mode defines one or more intervals available for receiving a response message in reply to the request message and one or more unavailable intervals;
   means for initiating a timer to keep track of the available intervals based on the information received about the power saving mode;
   means for suspending the timer during the one or more unavailable intervals of the power saving mode;
   means for resuming the timer during the one or more available intervals of the power saving mode; and
   means for transmitting the response message during one of the available intervals.

22. The apparatus of claim 21, further comprising:
   means for processing another request message received from another mobile station during one of the unavailable intervals.

23. The apparatus of claim 21, wherein the power saving mode comprises an idle mode.

24. The apparatus of claim 21, wherein the request message is received during an initial network entry procedure or a network re-entry procedure.

25. The apparatus of claim 24, wherein the request message is received during the initial network entry procedure after transmitting a Registration Response (REG-RSP) message.

26. The apparatus of claim 24, wherein the request message is received during the network re-entry procedure after transmitting a Ranging Response (RNG-RSP) message.

27. An apparatus for wireless communications, comprising:
   a processor;
   memory in electronic communication with the processor; and
   instructions stored in the memory, the instructions being executable by the processor to:
      transmit a request message, wherein the request message comprises information about a power saving mode;
      initiate a timeout timer to track a timeout period in which a response message in reply to the request message is expected;
      suspend the timeout timer during one or more unavailable intervals of the power saving mode; and
      resume the timeout timer during one or more available intervals of the power saving mode; wherein a mobile station is able to receive the response message in the available intervals.

28. The apparatus of claim 27, wherein the instructions are further executable by the processor to:
   receive the response message during one of the available intervals.

29. The apparatus of claim 27, wherein the instructions are further executable by the processor to:
   transmit another request message if the response message is not received before end of the timeout period.

30. The apparatus of claim 27, wherein the power saving mode comprises a sleep mode.

31. The apparatus of claim 27, wherein the instructions are further executable by the processor to:
   transmit the request message during an initial network entry procedure or a network re-entry procedure.

32. The apparatus of claim 31, wherein the instructions are further executable by the processor to:
   transmit the request message during the initial network entry procedure after receiving a Registration Response (REG-RSP) message.

33. The apparatus of claim 31, wherein the instructions are further executable by the processor to:
   transmit the request message during the network re-entry procedure after receiving a Ranging Response (RNG-RSP) message.

34. An apparatus for wireless communications, comprising:
   a processor;
   memory in electronic communication with the processor; and
   instructions stored in the memory, the instructions being executable by the processor to:
      receive a request message from a mobile station, wherein the request message comprises information about a power saving mode and the power saving mode defines one or more intervals available for receiving a response message in reply to the request message and one or more unavailable intervals;
      initiate a timer to keep track of the available intervals based on the information received about the power saving mode;
      suspend the timer during the one or more unavailable intervals of the power saving mode;
      resume the timer during the one or more available intervals of the power saving mode; and
      transmit the response message during one of the available intervals.

35. The apparatus of claim 34, wherein the instructions are further executable by the processor to:
   process another request message received from another mobile station during one of the unavailable intervals.

36. The apparatus of claim 34, wherein the power saving mode comprises an idle mode.

37. The apparatus of claim 34, wherein the instructions are further executable by the processor to:
   receive the request message during an initial network entry procedure or a network re-entry procedure.

38. The apparatus of claim 37, wherein the instructions are further executable by the processor to:
   receive the request message during the initial network entry procedure after transmitting a Registration Response (REG-RSP) message.

39. The apparatus of claim 37, wherein the instructions are further executable by the processor to:
   receive the request message during the network re-entry procedure after transmitting a Ranging Response (RNG-RSP) message.

40. A computer-program storage apparatus for wireless communications, comprising a memory device having instructions stored thereon, the instructions being executable by one or more processors and the instructions comprising:
   instructions for transmitting a request message, wherein the request message comprises information about a power saving mode;
   instructions for initiating a timeout timer to track a timeout period in which a response message in reply to the request message is expected;

instructions for suspending the timeout timer during one or more unavailable intervals of the power saving mode; and instructions for resuming the timeout timer during one or more available intervals of the power saving mode; wherein a mobile station is able to receive the response message in the available intervals.

41. The computer-program storage apparatus of claim 40, further comprising:

instructions for receiving the response message during one of the available intervals.

42. The computer-program storage apparatus of claim 40, further comprising:

instructions for retransmitting another request message if the response message is not received before end of the timeout period.

43. The computer-program storage apparatus of claim 40, wherein the power saving mode comprises a sleep mode.

44. The computer-program storage apparatus of claim 40, wherein the request message is transmitted during an initial network entry procedure or a network re-entry procedure.

45. The computer-program storage apparatus of claim 44, wherein the request message is transmitted during the initial network entry procedure after receiving a Registration Response (REG-RSP) message.

46. The computer-program storage apparatus of claim 44, wherein the request message is transmitted during the network re-entry procedure after receiving a Ranging Response (RNG-RSP) message.

47. A computer-program storage apparatus for wireless communications, comprising a memory device having instructions stored thereon, the instructions being executable by one or more processors and the instructions comprising:

instructions for receiving a request message from a mobile station, wherein the request message comprises information about a power saving mode and the power saving mode defines one or more intervals available for receiving a response message in reply to the request message and one or more unavailable intervals;

instructions for initiating a timer to keep track of the available intervals based on the information received about the power saving mode;

instructions for suspending the timer during the one or more unavailable intervals of the power saving mode;

instructions for resuming the timer during the one or more available intervals of the power saving mode; and instructions for transmitting the response message during one of the available intervals.

48. The computer-program storage apparatus of claim 47, further comprising:

instructions for processing another request message received from another mobile station during one of the unavailable intervals.

49. The computer-program storage apparatus of claim 47, wherein the power saving mode comprises an idle mode.

50. The computer-program storage apparatus of claim 47, wherein the request message is received during an initial network entry procedure or a network re-entry procedure.

51. The computer-program storage apparatus of claim 50, wherein the request message is received during the initial network entry procedure after transmitting a Registration Response (REG-RSP) message.

52. The computer-program storage apparatus of claim 50, wherein the request message is received during the network re-entry procedure after transmitting a Ranging Response (RNG-RSP) message.

* * * * *